United States Patent
Jagadev et al.

(10) Patent No.: US 10,621,217 B2
(45) Date of Patent: *Apr. 14, 2020

(54) PORTABLE GLOBE CREATION FOR A GEOGRAPHICAL INFORMATION SYSTEM

(71) Applicant: Google LLC, Mountain View, CA (US)

(72) Inventors: Manas Ranjan Jagadev, San Jose, CA (US); Eli Dylan Lorimer, San Francisco, CA (US); Bret Peterson, Lafayette, CA (US); Vijay Raman, Santa Clara, CA (US); Mark Wheeler, Monte Screno, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/371,309

(22) Filed: Apr. 1, 2019

(65) Prior Publication Data

US 2019/0228572 A1 Jul. 25, 2019

Related U.S. Application Data

(63) Continuation of application No. 16/024,988, filed on Jul. 2, 2018, now Pat. No. 10,249,081, which is a (Continued)

(51) Int. Cl.
*G06F 3/0484* (2013.01)
*G06F 3/0485* (2013.01)
(Continued)

(52) U.S. Cl.
CPC ............ *G06F 16/29* (2019.01); *G06F 3/0485* (2013.01); *G06F 3/04842* (2013.01);
(Continued)

(58) Field of Classification Search
CPC .......................... G06T 17/00; G06T 2210/36
See application file for complete search history.

(56) References Cited

U.S. PATENT DOCUMENTS

| 5,760,742 A | 6/1998 | Branch et al. |
| 7,225,207 B1 | 5/2007 | Ohazama et al. |

(Continued)

FOREIGN PATENT DOCUMENTS

| WO | WO 2006/127749 | 11/2006 |
| WO | WO 2011/106415 | 9/2011 |

OTHER PUBLICATIONS

Minoux, "Enabling Virtual-Globe Browsing on Memory-Constrained Platforms", Proceedings of the Joint Workshop on Visualization and Exploration of Geospatial Data, Jun. 27-29, 2007, Stuttgart, Germany, 6 pages.

(Continued)

*Primary Examiner* — Phi Hoang
(74) *Attorney, Agent, or Firm* — Dority & Manning, P.A.

(57) ABSTRACT

Portable globes may be provided for viewing regions of interest in a Geographical Information System (GIS). A method for providing a portable globe for a GIS may include determining one or more selected regions corresponding to a geographical region of a master globe. The method may further include organizing geospatial data from the master globe based on the selected region and creating the portable globe based on the geospatial data. The portable globe may be smaller in data size than the master globe. The method may include transmitting the portable globe to a local device that may render the selected region at a higher resolution than the remainder of the portable globe in the GIS. A system for providing a portable globe may include a selection module, a fusion module and a transmitter. A system for updating a portable globe may include a packet bundler and a globe cutter.

20 Claims, 11 Drawing Sheets

Related U.S. Application Data continuation of application No. 15/663,861, filed on Jul. 31, 2017, now Pat. No. 10,013,799, which is a continuation of application No. 15/407,306, filed on Jan. 17, 2017, now Pat. No. 9,721,382, which is a continuation of application No. 13/592,256, filed on Aug. 22, 2012, now Pat. No. 9,672,658, which is a continuation of application No. PCT/US2011/025913, filed on Feb. 23, 2011, which is a continuation-in-part of application No. 12/711,044, filed on Feb. 23, 2010.

(51) Int. Cl.
*G06F 16/29* (2019.01)
*G06F 16/56* (2019.01)
*G06T 3/40* (2006.01)
*G06T 11/60* (2006.01)

(52) U.S. Cl.
CPC .............. *G06F 16/56* (2019.01); *G06T 3/40* (2013.01); *G06T 11/60* (2013.01); *G06F 2203/04806* (2013.01); *G06T 2210/08* (2013.01); *G06T 2210/36* (2013.01)

(56) References Cited

U.S. PATENT DOCUMENTS

| | | |
|---|---|---|
| 2004/0117358 A1 | 6/2004 | von Kaenel et al. |
| 2004/0157641 A1 | 8/2004 | Chithambaram et al. |
| 2006/0208927 A1 | 9/2006 | Poor et al. |
| 2008/0002894 A1 | 1/2008 | Hayon et al. |
| 2008/0147366 A1 | 6/2008 | Schutz et al. |
| 2008/0307498 A1 | 12/2008 | Johnson et al. |
| 2009/0262133 A1 | 10/2009 | Opala et al. |
| 2009/0303251 A1 | 12/2009 | Balogh et al. |
| 2010/0007669 A1 | 1/2010 | Bethune et al. |

OTHER PUBLICATIONS

International Preliminary Report on Patentability for International Patent Application No. PCT/US2011/025913, International Bureau of WIPO, Geneva, Switzerland, dated Sep. 7, 2012, 9 pages.

International Search Report for International Patent Application No. PCT/US2011/025913, European Patent Office, Netherlands, dated Oct. 7, 2011.

The Written Opinion of the International Searching Authority for International Patent Application No. PCT/US2011/025913, European Patent Office, Germany, dated Oct. 7, 2011.

PORTABLE GLOBE CREATION FOR A GEOGRAPHICAL INFORMATION SYSTEM

PRIORITY CLAIM

This application is a Continuation of and claims priority to U.S. patent application Ser. No. 16/024,988, having a filing date of Jul. 2, 2018, which is a Continuation of and claims priority to U.S. patent application Ser. No. 15/663,861, having a filing date of Jul. 31, 2017, which is a Continuation of and claims priority to U.S. patent application Ser. No. 15/407,306, having a filing date of Jan. 17, 2017 (issued as U.S. Pat. No. 9,721,382), which is a Continuation of and claims priority to U.S. patent application Ser. No. 13/592,256, having a filing date of Aug. 22, 2012 (issued as U.S. Pat. No. 9,672,658 on Jun. 6, 2017), which is a Continuation of and claims priority to International Appl. No. PCT/US2011/025913, filed Feb. 23, 2011, which is a Continuation-in-Part of and claims priority to U.S. patent application Ser. No. 12/711,044, filed Feb. 23, 2010, entitled "Portable Globe Creation for a Geographical Information System." All of the above applications are incorporated by reference herein in their entirety.

BACKGROUND

Technical Field

The embodiments described herein relate to geographical information systems.

Background Art

Geographic Information Systems (GIS) capture, store, manage and display data elements according to geospatial coordinates. For example, Google Earth renders satellite imagery, terrain, vectors and other data over a three-dimensional geometry representing the Earth's surface. Google Earth users can "fly" or navigate around a virtual Earth, while data and images corresponding to geographical locations are presented in varying degrees of detail.

In order to provide this user experience, an enormous amount of geospatial data may be organized and indexed into a "globe." A globe is a directory hierarchy containing a number of bundled files that are organized in a way such that imagery, terrain, and vectors can be easily served to a client. High resolution globes are created by organizing tens of terabytes of imagery, terrain, and vector data that are fused together to create a navigable globe. The fused globe allows smooth panning and zooming to any view point, allowing in-context viewing of large amounts of data. The globes support both exploration as well as search for particular features.

These globes are invaluable tools for industry and government analysts and operational users who depend on access to the central servers that provide the globes' data to their "spinning earth" clients. However, sometimes such access is not available. For example, military, first responder, or relief efforts on the ground need access to globe data relevant to their area of interest, but there may be no way for them to connect to the large, central globe, or they may only have limited connectivity for short periods of time.

BRIEF SUMMARY

Embodiments described herein refer to systems and methods for providing a portable globe for a geographical information system (GIS). According to an embodiment, a method for providing a portable globe for a GIS may include querying a database for one or more geographical coordinates based on query information. Query information may include parameters based on demographic (actors, historical factors, political factors, etc. For example, query information may include cities or population centers having a certain population. The database query may return geographical coordinates, such us longitude and latitude coordinates, for bounded areas of qualifying cities. The geographical coordinates may be converted into quadtree addresses based on a selected resolution level. The method may determine al least one selected region corresponding to a geographical region of a master globe based on the quadtree addresses.

The geospatial data from the master globe may be organized based on the selected regions. This may include the quadtrees of the one or more selected regions. The method may further create the portable globe based on the organized geospatial data. The portable globe is smaller than the master globe and comprises data files that include greater geospatial data for the selected regions than the remainder of the portable globe. Finally, the method transmits the portable globe to a local device configured to render the portable globe in the GIS. The selected regions are capable of being rendered at a higher resolution than the remainder of the portable globe.

According to another embodiment, a system for providing a portable globe for a GIS may include a selection module configured to query a database for one or more geographical coordinates based on query information, convert the geographical coordinates to quadtree addresses, and determine at least one selected region corresponding to a geographical region of a master globe based on the quadtree addresses. The system may also include a fusion module configured to organize geospatial data from the master globe based on the at least one selected region and create a portable globe based on the organized spatial data. The portable globe may comprise one or more data files that include greater geospatial data for the selected regions than for the remainder of the portable globe. The system may further include a transmitter configured to transmit the portable globe to a local device that is configured to render the portable globe in the GIS. The selected regions of the portable globe are then capable of being rendered at a higher resolution than the remainder of the portable globe.

According to a further embodiment, a method for updating a portable globe for a GIS may include receiving a request for updated geospatial data based on at least one selected region from a local device capable of displaying a spinning-earth GIS. Packet requests may be generated for each layer of the at least one selected region. The method also includes obtaining updated geospatial data from a master globe server using the generated packet requests. A series of packet request may be generated individually or in a bundled format. A new portable globe is created based on the updated geospatial data. The new portable globe may be created based on the updated geospatial data by comparing the updated geospatial data with an old portable globe. The new portable globe may be created without redundant globe data, such as front the old portable globe. The method then includes providing the new portable globe to the local device with a reference to the old portable globe. The local device can display an updated portable globe having data files that include greater geospatial data for the selected regions than for the remainder of the portable globe so that the updated globe can be rendered at a higher resolution than the remainder of the portable globe in the spinning-earth GIS on the local device.

According to another embodiment, a system for updating a portable globe for a GIS may include a packet bundler configured to receive a request for updated geospatial data based on at least one selected region from a local device capable of displaying a spinning-earth GIS, generate packet requests for each layer of the selected regions, and obtain updated geospatial data from a master globe server using the generated packet requests. The system may also include a globe cutter configured to create a new portable globe based on the updated geospatial data by comparing the updated geospatial data with an old portable globe. The new portable globe may be created without redundant globe data. The globe cutter may also be configured to create an updated portable globe based on the organized geospatial data and provide the updated portable globe to the local device with a reference to the old portable globe. The local device can display the updated portable globe having data files that include greater geospatial data for the selected regions than for the remainder of the portable globe so that the selected regions globe can be rendered at a higher resolution than the remainder of the portable globe in the spinning-earth GIS on the local device.

According to a further embodiment a method for rendering an updated portable globe on a local device for a GIS may include requesting, from a globe server, updated geospatial data for at least one selected region to update an old portable globe used for displaying a spinning-earth GIS. The at least one selected region is capable of being rendered at a higher resolution than the remainder of the old portable globe. The method may also include obtaining the new portable globe with a reference to the old portable globe. The method may further include creating an updated portable globe with the new portable globe and the referenced old portable globe. The method may include rendering the updated portable globe in the spinning-earth GIS.

According to another embodiment, a system for rendering an updated portable globe on a local device for a GIS may include a requester configured to request, from a globe server, updated geospatial data for at least one selected region to update an old portable globe used for displaying a spinning-earth GIS. The at least one selected region is capable of being rendered at a higher resolution than the remainder of the old portable globe. The requester may obtain the new portable globe with a reference to the old portable globe. The system may also include a globe creator configured to create an updated portable globe with the new portable globe and the referenced old portable globe and render the updated portable globe in the spinning-earth GIS.

Further embodiments, features, and advantages, as well as the structure and operation of the various embodiments are described in detail below with reference to accompanying drawings.

BRIEF DESCRIPTION OF THE FIGURES

Embodiments are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION OF THE INVENTION

Embodiments are described herein with reference to illustrations for particular applications. It should be understood that the invention is not limited to the embodiments. Those skilled in the art with access to the teachings provided herein will recognize additional modifications, applications, and embodiments within the scope thereof and additional fields in which the embodiments would be of significant utility.

Google Earth renders satellite imagery and other data over a three-dimensional geometry representing the Earth's surface. This geospatial data may be organized and indexed into a "globe," or a directory hierarchy containing a number of packet bundles (files) that can be used to serve imagery, terrain, and vectors to a Google Earth server or clients. High resolution globes may be organized by using tens of terabytes of imagery, terrain, and vector data at a variety of resolutions from a variety of sources and "fusing" the geospatial data together to create a navigable globe. The fused globe allows smooth panning and zooming to any view point, allowing in-context viewing of large amounts of data.

The globes are invaluable tools for industry and government analysts who have access to the central servers that provide the globes' data to their "spinning earth" clients. However, sometimes such access is not available. For example, military, first responder, or relief efforts on the ground need access to globe data relevant to their current location, but there may be no way for them to reach the large, central master globe. Some solutions have involved forcing the resource-intensive globe fusion process to a local laptop of a user. However, laptops and local devices may not be able to handle the fusion process. Also, if there are many different regions of interest, this becomes a major database management undertaking and deployment with existing systems is far from straightforward.

Figure 1:
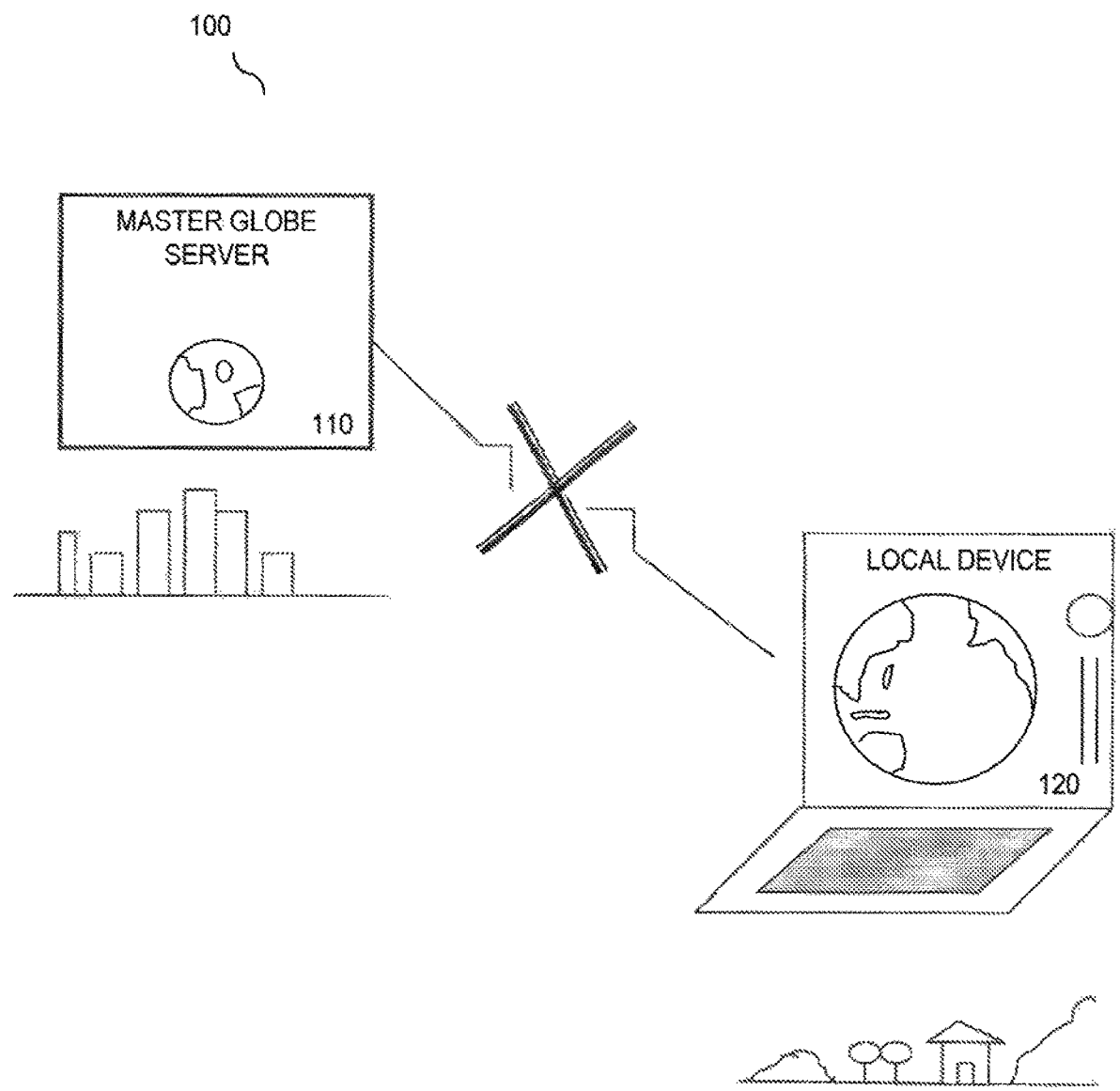
FIG. 1 is a diagram of a system for providing a portable globe for a geographical information system (GIS), according to an embodiment of the present invention.

Embodiments described herein relate to providing a portable globe to a geographical information system (GIS). According to many embodiments, a portable globe may be created based on one or more regions selected from a master globe, a large central globe that includes imagery, terrain, and vector data. The portable globe may be a new, potentially much smaller globe that can be transmitted to a local computing device and rendered by a "spinning earth" client or server on the local device. The portable globe may be used with or without network connectivity and can be easily distributed to people on the ground. For example, FIG. 1 shows a master globe server 110 located in a city. A region of interest is selected and a portable globe is created and served to local device 120. The selected region of the Earth is more remote and local device 120 will be operating without network connectivity. In some cases, there may be network connectivity, but not of a sufficient bandwidth to adequately handle the data transfer of a globe. Many users tend to have well-defined regions of interest, so they do not require access to the lobe in its entirety, only a small portion of it. The portable globe is a lightweight solution that supports easy grab-and-go capabilities.

Example System

Figure 2:
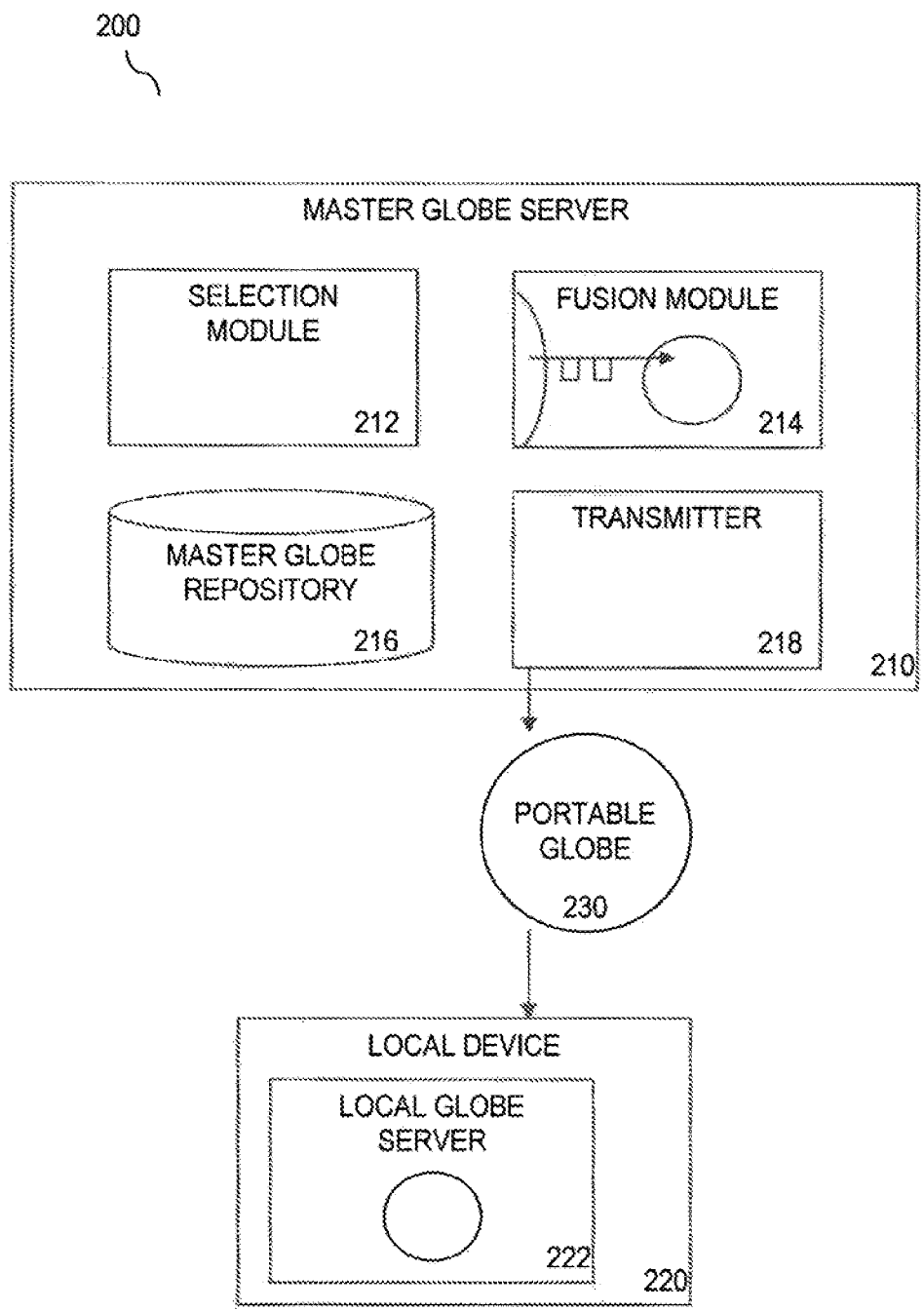
FIG. 2 is a diagram of a system for providing a portable globe for a GIS, according to an embodiment.

FIG. 2 shows an exemplary system 200 for providing a portable globe for a geographical information system (GIS), according to an embodiment. System 200 shows master globe server 210 that can transmit a portable globe 230 to local device 220. Master globe server 210 may include selection module 212, fusion module 214, master globe repository 216 and transmitter 218.

Master globe server 210 may be a processor-based computing device. In other cases, master globe server 210 may be software executed on a processor-based computing device. A computing device can be any type of device having one or more processors. For example, a computing device can be a workstation, mobile device (e.g., a mobile phone, personal digital assistant, tablet or laptop), computer, server, compute cluster, server farm, game console, set-top box, kiosk, embedded system or other device having at least one processor and memory. Embodiments of the present invention may be software executed by a processor, firmware, hardware or any combination thereof in a computing device. According to a further embodiment, master globe server 210 may include one or more databases, such as master globe repository 216. Local device 220 may also be a computing device.

Master globe server 210 may be configured to execute or provide computer software or data, according to an embodiment. Such software or data may relate to graphics applications that render or serve high resolution images, such as in a geographical information system (GIS). These software applications may be displayed in a user interface on master globe server 210 or served to and displayed on a user interface on a client computer, such as local device 220. The user interface may be served through a web-based application that is executed on local device 220. Web-based applications may include web browsers. Web-based applications may also include thin client applications that retrieve content from and provide content to master globe server 210.

According to an embodiment, a user or administrator may select one or more geographical regions of the Earth. These regions may be selected from a master globe. Region selection may be performed using selection module 212. According to some embodiments, selection module 212 may be configured to provide a user interface to enable a user to select a region from a master globe. A master globe may be stored in master globe repository 216. The user interface may provide a number of tools that allow a user to spin around and navigate a virtual display of the Earth. For example, the user interface may be a Google Earth interface. In some cases, certain regions may be searched using search data or tables associated with a master globe.

A geographical region may be selected from a master globe. A selected region may sometimes be a region of interest (ROI), or any localized area where a user has indicated a particular interest. Regions may be selected in a number of ways, for example, by rectangles, ellipses, polygons or any method to focus attention on a specific area. According to an embodiment, a user or administrator may select a region by drawing a polygon encompassing a region of interest. Regions may also be selected using multiple polygons.

Figure 3:
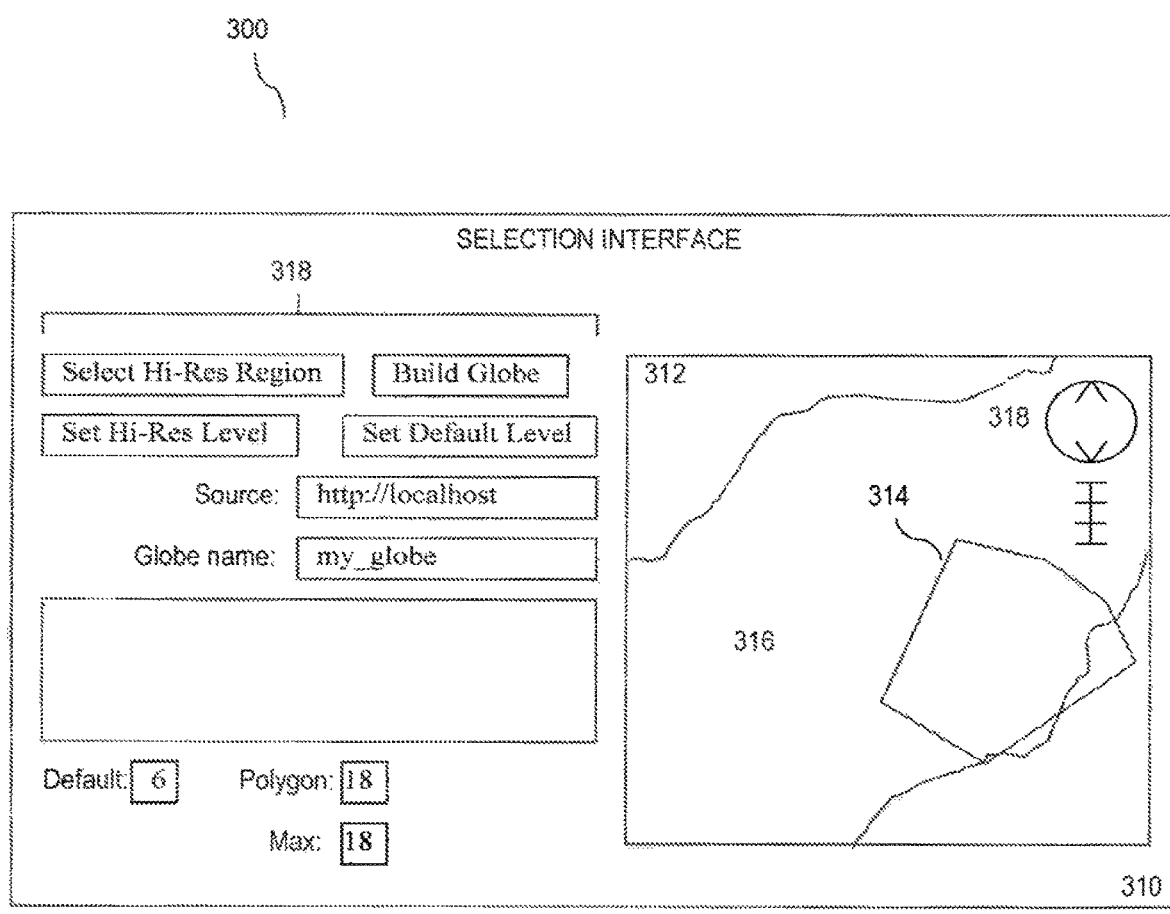
FIG. 3 is an example display of selecting a region of interest, according to an embodiment.

FIG. 3 illustrates an example display view 300 of a user interface, such as selection interface 310, according to an embodiment. In some cases, selection interface 310 may be provided by selection module 212. In most cases, selection interface 310 may be displayed through a web-based application window, such as a web browser window. In this case, selection interface 310 shows an image 312 of a country 316 that may be navigated or manipulated with display tools 318. A region of the Earth may be selected using polygon 314. In some cases, selection interface 310 can show different color lines or additional graphic helps to guide a user through the polygon construction process. In other cases, selection interface 310 may provide polygon selection shapes such as rectangular frames.

A master globe may be layered with a number of levels, according to an embodiment. Each level may render images at a certain resolution. At a given level, the surface may be made of a number of data nodes, such as quadtree nodes. A quadtree is a tree data structure in which each internal node has up to four recursively subdivided regions. For instance, a number of quadtree nodes may exist for a given resolution level. If a higher resolution level is available, the next resolution level will have four quadtree nodes where the original level had one.

According to a further embodiment, a resolution at which a polygon is to be considered may be predetermined or explicitly set using other selection interface tools 318. A default resolution level is a level at which all imagery, terrain, and vector data are included in the portable globe, whether or not they are in the selected region. A polygon level is a level at which quadtree nodes are used to define the polygon and its interior. A polygon level will likely not be a higher resolution than the maximum level.

According to some embodiments, all portions of the Earth overlapping the polygon at a specified resolution are preserved. In most cases, this may be at a maximum resolution, where all imagery, terrain, and vector data that is in the selected region is included in the portable globe. For the rest of the master globe, a background or default resolution may be set. In most cases, this may be a lower resolution, or even a minimum resolution. Once one or more selections are made, selection information is received by selection module 212, according to an embodiment hi some cases, location information and resolution information are received. In other cases, only information location is received and resolution information is determined or inferred by selection module 212 or fusion module 214.

Figure 4:
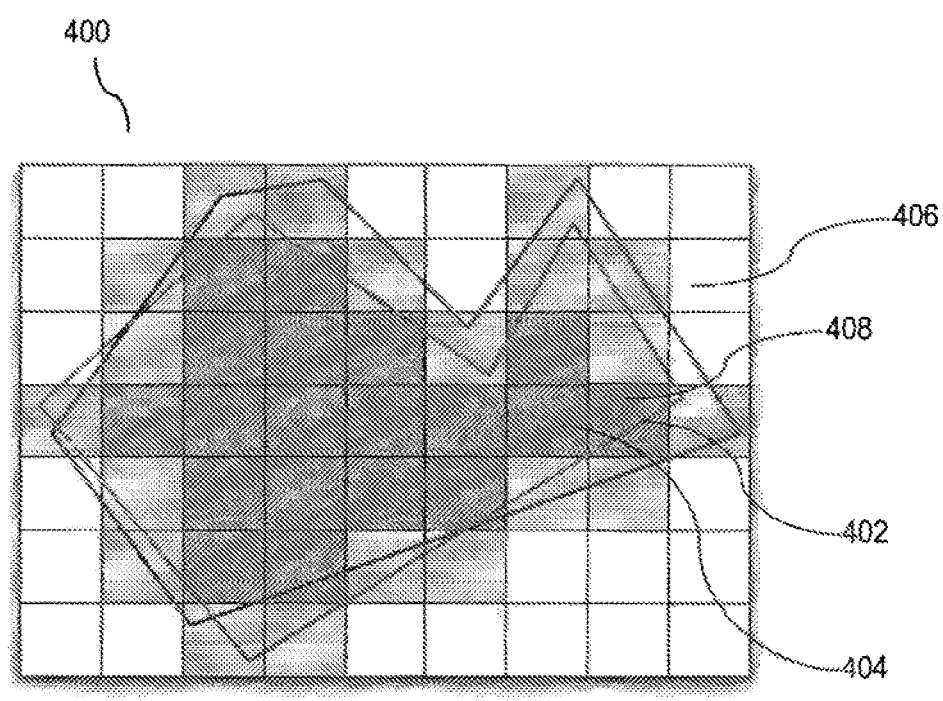
FIG. 4 is diagram of a selection of quadtree nodes, according to an embodiment.

According to an embodiment, vertices of a polygon at a given polygon level may guarantee that quadtree nodes at that level that contain the vertices will be included in a selected region. These vertex quadtree nodes may consequently be thought of as new vertices for a polygon defined at the polygon level. This new polygon may then be "drawn and filled" at the polygon level using the quadtree nodes as pixels. FIG. 4 shows an example diagram 400 of a selection of quadtree nodes, according to an embodiment. In this case, each block may represent a quadtree node. Polygon 402 may define a selected region. All quadtree nodes included in polygon 402, such as node 404, may be included as part of the selected region. Node 406 is outside the selected region. In some cases, edges of polygon 402 may not be used, so it is possible for parts of the edges to be outside of the quadtree nodes in the selected region. If all nodes are filled at a lower level, a quadtree node path is stored for that lower level node rather than storing the node paths for all of the higher resolution nodes, according to an embodiment. Sets of node paths may be appended to create multiple high resolution regions of interest.

According to a further embodiment, a portable globe is built by "walking" the quadtree. If a node is at or below a default resolution level, all of the data it specifies is moved to the portable globe. Likewise for nodes that fall within the specified high resolution region of interest. This region expands as you move up from the polygon level to lower levels. If no data from the node is being saved, then the node and all of its children are removed from the quadtree.

According to a further embodiment, a portable globe may ensure that the selected region is represented at lower resolution by preserving the quadtree nodes at every level that encapsulate those in the selected region. This means that a neighboring region may or may not be included at fairly high-resolution, depending on how close it is to the polygon edge and to certain quadtree node boundaries. For example, node 408 of FIG. 4 is on a polygon edge. This behavior may be considered reasonable because since the neighboring region was not included in the polygon, it may not have been of great interest. In this case, these neighboring regions may be included only so that the region of interest can be seen at low resolution, and at these resolutions they may very well have detail from neighboring regions in their raster or vector packets. In other embodiments, an image pixel may appear at different levels depending on expanding quadtree node boundaries. A feature may be seen at higher resolutions; however, resolution may not improve once the feature no longer shared a quadtree node with the polygon.

According to a further embodiment, selection information received by selection module 212 may be used by fusion module 214 to determine what portions of the master globe to retrieve for a new portable globe. Fusion module 214 may be configured to organize geospatial data from the master globe based on a selected region. Fusion module 214 may also be configured to create a portable globe based on the organized spatial data. The portable globe may comprise data files that include greater geospatial data for the selected region than for the remainder of the portable globe. According to another embodiment, organizing may include retrieving master globe tiles and data for the at least one selected region at a higher resolution in order for the portable globe to render a higher resolution for the at least one selected region.

According to an embodiment, a portable globe is created by retrieving image, terrain and vector data tiles and data from a master globe. As fusion module 214 moves to lower resolutions, any tiles and data that overlap the region of interest are kept. This helps to ensure that high resolution features in the region of interest can be spotted and zoomed in on from lower resolutions. Fusion module 214 continues until a default resolution is reached, at which point all data from the master globe is kept. Finally, all searchable data that is within the specified region of interest is retrieved from a database.

The retrieved tiles and search data are stored in a form that constitutes a portable globe. The portable globe can be easily downloaded to any laptop or portable storage device and accessed via a local server or client with or without a network. The data is served by a light-weight server system that can run on multiple platforms including Windows, Mac OS X, and Linux.

Fusion module 214 may be configured to use a keyhole file technique for creating a portable globe, according to an embodiment. For example, a keyhole flat file (KFF) is a set of data packets that are spatially indexed. A KFF technique is disclosed in U.S. Pat. No. 7,225,207 to Chikai Obazama et al., which is herein incorporated by reference. Such techniques may include a dbroot file, which contains information used fir deployment of KIT data to a client or server, such as a Google Earth client. In such cases, fusion may involve rewriting a dbroot file and changing the locations of search tab servers. Also, icons from a dbroot file may be downloaded to the portable globe directory. High resolution quadtree nodes, a default level, and a maximum level may be used to get quadtree packets, imagery, terrain, and vector data for a portable globe. According to a further embodiment, a polygon may be used to obtain search data from a database. Search data tables may be moved to the portable globe directory. In another embodiment, the portable globe directory may be wrapped as a compressed tarball and moved to a downloadable location.

According to another embodiment, packet bundles may provide a means of storing a large number of indexed packets in a limited number of files that have a maximum size (e.g. 2 GB). The packets may be stored in their "network-ready" state, so they can be extracted from the bundle and passed directly to a Google Earth server or client or a local device. A portable globe may include a directory containing one or more packet bundle directories. Data files and the index file of a packet bundle are stored at the same level in a single directory. The index file may be ordered by the quadtree path address, and a binary search can be done on it to find the data file id and the offset into the file for any packet. Packet type may be stored in the index, so it is possible to put an entire globe into a single packet bundle.

According to another embodiment, separate packet bundles may be used for most of the packet types, except that the dbroot may be combined with its associated quadtree packets. A reason for this may be that separation provides more full in-memory caching options so that we might, for example, cache some of the indexes in memory but not all of them if there is not enough room. It also could improve performance of delta updates since certain packet types might be updated infrequently.

A packet bundle writer may only support writing a packet bundle from scratch, according to a further embodiment. A new index file and an initial data file may be created. The packets may then be given in correct quadtree order so that the resulting index is in order. Packets may also be appended to a current data file until it is full, and then a new data file is started. This ordered approach makes merging two packet bundles very straightforward.

According to another embodiment, an initial packet bundle reader may support a binary disk-based search of an index. An alternative form may allow the index to be cached in memory. The reader may locate the index entry for a given quadtree path and use that entry to find the packet in one of the data files. The reader may also support just returning the index entry information so that the calling routine can read the packet directly itself.

A packet bundle merger may include two modified readers and a standard writer, according to an embodiment. One reader will be tagged as dominant. The merger traverses both indexes in sequential order, grabbing the next packet in the sequence from whichever reader has it and forwarding that packet to the writer. If both readers have the packet, then the dominant reader's packet is used. The merger allows two portable globes to be combined. Merger will be useful for delta updates.

Transmitter 218 of exemplary system 200 may be configured to transmit a portable globe, such as portable globe 230, to a local device, such as local device 220 configured to render the portable globe in the GIS, according to an embodiment. For example, local globe server 222 may be used to render portable globe 230. Local globe server 222 may be a localhost server, such as a Google Earth server on local device 220. Local device 220 may also render portable globe 230 using a client, such as a Google Earth client or a Google Earth viewer. The selected region of the portable globe is capable of being rendered at a higher resolution than the remainder of the portable globe. According to some embodiments, servers may support both localhost-only and shared serving so that the globe can be viewed by only the local machine or shared with a small number of users on a local network.

Example Method

Figure 5:
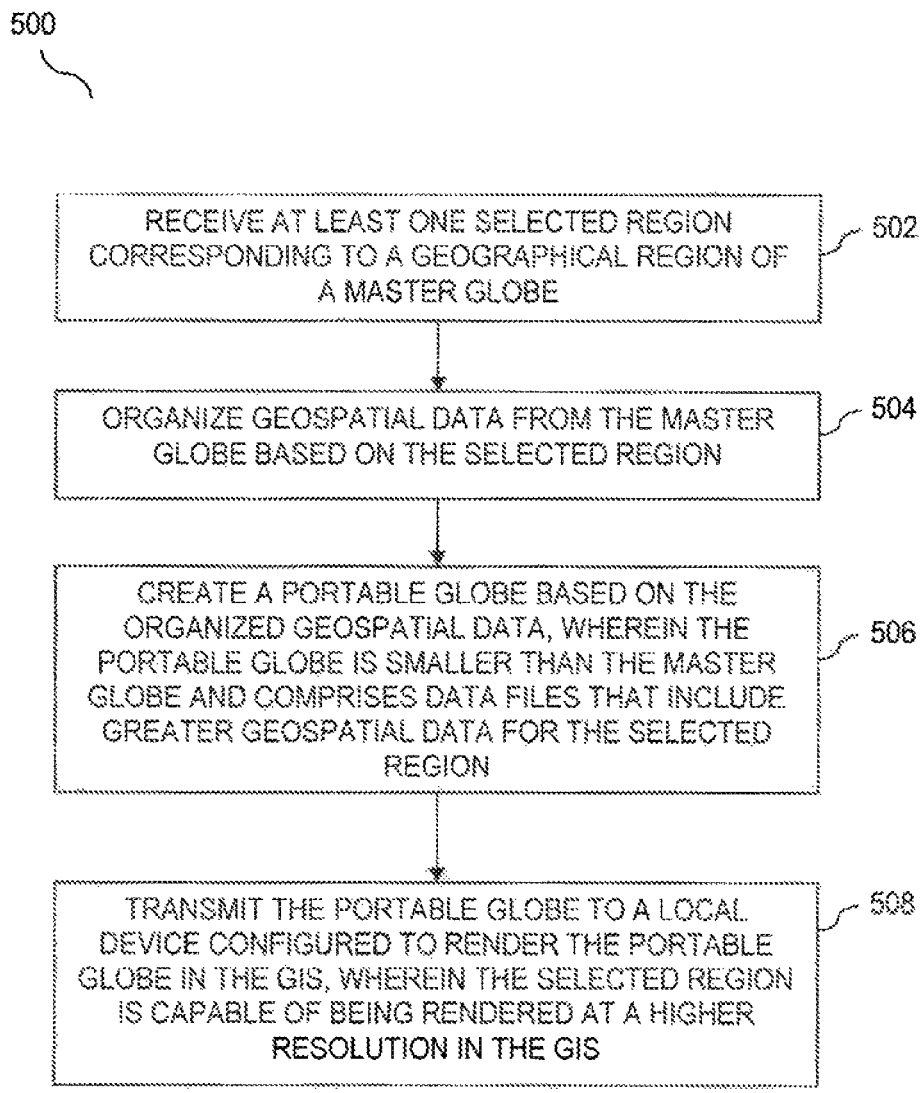
FIG. 5 is a flowchart illustrating a method for providing a portable globe for a GIS, according to an embodiment.

FIG. 5 is a flowchart illustrating an exemplary method 500 for providing a portable globe for a geographical information system (GIS), according to an embodiment. In step 502, at least one selected region corresponding to a geographical region of a master globe is received. Selection information may be received, for example, by selection module 212. In some cases, selection module 212 may assist in deter mining the selection information.

According to an example embodiment, a user may perform the following steps to select a region. First, a user viewing an area of the Earth proximate to a region of interest in a selection interface may zoom out to a low-level resolution for the background globe. The user may set this resolution as a default level. For example, a user may click on the "Set Default Level" button shown in selection interface 310 in FIG. 3. The user may then navigate to a region of interest. The user may zoom into the highest resolution at which the user would want to view the selected region. The user may then set this resolution as a high resolution level. A user may then select the high resolution region by drawing a polygon around the region of interest. A source server and globe name may be specified.

In step 504, geospatial data from the master globe may be organized based on the selected region. According to an embodiment, organization may include retrieving master globe tiles and data for the selected region at a higher resolution. This may provide for rendering the portable globe at a higher resolution for the selected region than for the remainder of the portable globe. According to a further embodiment, organization may includes retrieving master globe tiles and data at a higher resolution for imagery, terrain and vector data.

In some cases, selected asset types may be received and geospatial data from the master globe may be organized based on the selected asset type. Asset types include, but are not limited to, different types of data included in a globe, such as imagery, terrain, and vectors. Imagery and terrain may be considered raster data because they correspond to data values in a rectangular grid, where the data is a color value for imagery and an altitude for terrain. Vector data refers to shapes, e.g. points, polygons, poly lines, etc. that have metadata associated with them. For example, a point could refer to the center of a city and have the city name and population associated with it, or a polygon line could describe a road and have the road name associated with it.

Organization may include setting a first resolution for the selected region and a second resolution for geospatial data to be retrieved from the rest of the master globe, according to an embodiment. A higher or maximum resolution may be set for the selected region while a default or lesser resolution may be set for the remainder of the master globe. These resolution levels may be predetermined and/or selected by a user or administrator during the region selection process. According to a further embodiment, organization may include retrieving searchable data from the master globe for the selected region. It is also possible to include searchable data from the rest of the master globe; however, this searchable data may be a lesser amount to correspond with a lesser resolution of the remainder of the globe.

In step 506, the portable globe is created based on the organized geospatial data. The portable globe may be smaller (in data size) than the master globe and comprise data files that include greater geospatial data for the at least one selected region than for the remainder of the portable globe. This is due to higher resolutions and greater data retrieved and organized for the selected region and less data retrieved for non-selected regions. In some cases, globe creation or fusion (or cutting) may be performed for different asset types or managed separately with potentially different regions of interest. According to embodiments, steps 504 and 506 may use selection module 212, fusion module 214, master globe repository 216, or any combination of these modules.

Other techniques for providing geospatial data for a portable globe may be used, according to other embodiments. For instance, a portable globe may be created by stripping asset data from a master globe and leaving asset data strictly for that of a selected region. Different techniques may be used for different assets. For example, imagery, terrain and vector data may be created for a portable globe by including geospatial data of a master globe for areas that overlap with a selected region. Search data may be retrieved only for data strictly in the selected region. Other data may be stripped down for all areas outside the selected region. In some cases, multi-polygon regions may be selected. Sometimes Boolean flags may be used for inclusion of terrain and vectors. In other cases, portable globe searches may be separated from external searches.

The portable globe is transmitted to a local device, in step 508. The local device may be configured to render the portable globe in a GIS, such as Google Earth. The selected region may be capable of being rendered at a higher resolution than the remainder of the portable globe. Also, more geospatial data and search data may be associated with the selected region. Transmitter 218 may be used for this step. According to an embodiment, a user may choose to build a globe and then follow a provided URL link to download the created portable globe.

According to another embodiment, step 502 may be replaced with a determination of a selected region. According to a further embodiment, step 508 may be replaced with providing the portable globe to a local device that can render the selected region at a higher resolution than the remainder of the portable globe in a spinning-earth GIS. In some cases, a number of portable globes may be available to a local device based on previous region selections. In other cases, a catalog module configured to provide display information corresponding to the portable globe and other portable globes may be used to provide portable globes to a local device. Such a catalog may allow browsing and downloading of free or purchased portable globes.

In addition, a downloader configured to provide a selected portable globe to a local device may be used. Once served or rendered in a spinning-earth GIS on the local device, the selected region may be capable of being rendered at a higher resolution than the remainder of the portable globe. According to some embodiments, a zip or gz tarball may be created for a globe to be downloaded. Built-in consistency checks (CRC) on the downloads and unpacking may also be included.

According to further embodiments, server and globe management methods may be used. For example, organization may include filtering geospatial data based on filtering information Filtering information may include filter parameters, data or metadata features. Filtering information may also include, but is not limited to, permissions, license information, dates, sources, vector layers, quality metrics or other asset metadata. In other examples, a default server may only accept connections from the local device or a limited number of IP addresses. In one scenario, an IP address could be cleared by restarting the server so it would not overly constrain different usage patterns. Encryption may also be used. Also, very focused regions of interest may help limit demand for unauthorized access to portable globes. In other cases, search may be an easy place to limit a portable globe's extent. As a default, dbroot search URLs may be set to only point back at localhost.

Figure 6:
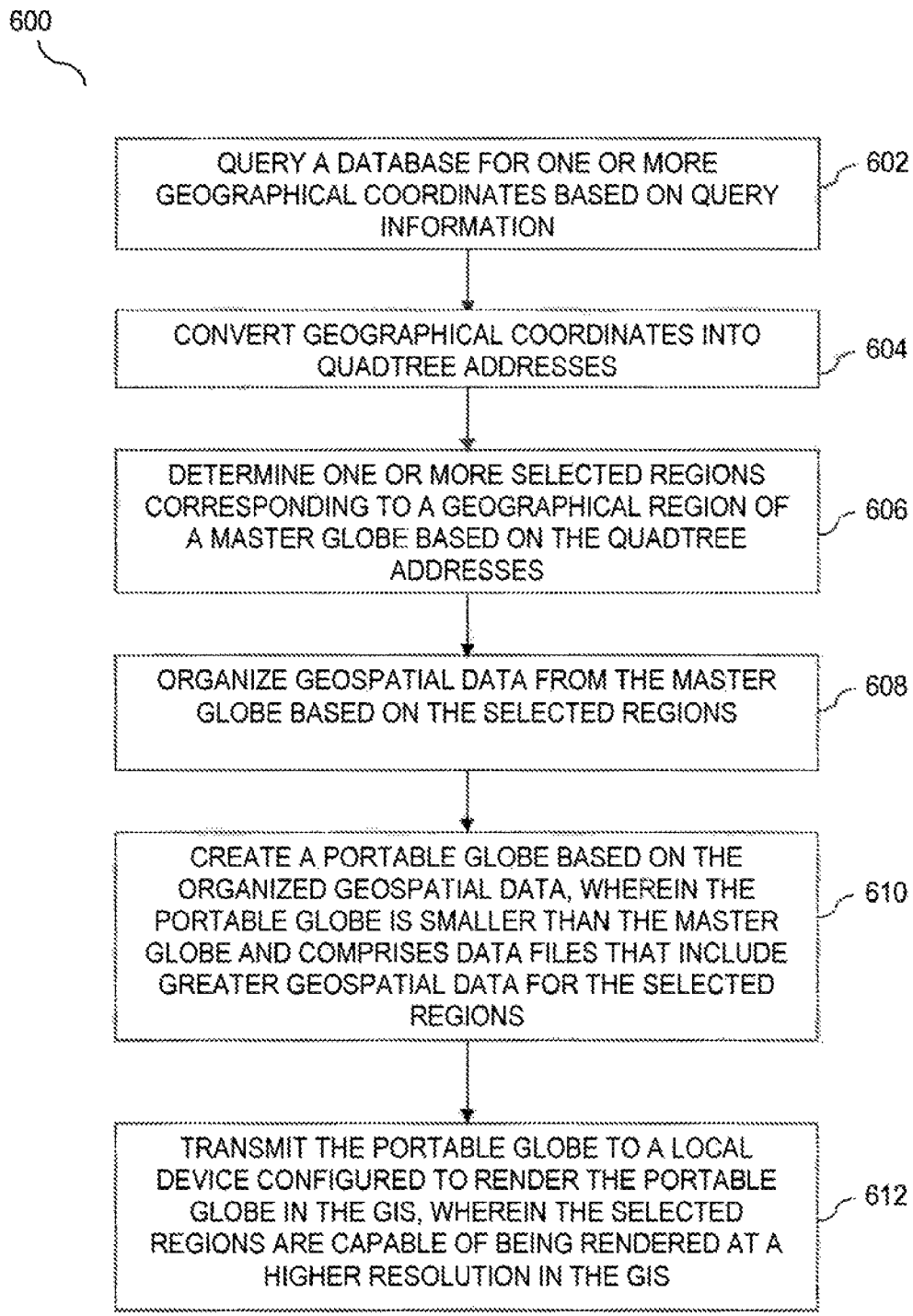
FIG. 6 is a flowchart illustrating a method for providing a portable globe for a GIS, according to an embodiment.

FIG. 6 is a flowchart illustrating an exemplary method 600 for providing a portable globe for a geographical information system (GIS), according to an embodiment. In step 602, a database is queried for one or more geographical coordinates based on query information. The database may be located locally or remotely. The query information may automatically be generated by a set of parameters or it may be user selected. The query information may also be received, for example, by selection module 212. In some cases, selection module 212 may assist in determining the query information.

In step 604, the one or more geographical coordinates are converted into quadtree nodes based on a selected resolution level. All quadtree nodes contained within the geographical coordinates of the query may be included as part of the selected query region. In some cases, edges of quadtree nodes near the edges of a query region may not be used, so it is possible for parts of the edges to be outside of the quadtree nodes in the selected region. If all nodes are filled at a lower level, a quadtree node path is stored for that lower level node rather than storing the node paths for all of the higher resolution nodes, according to an embodiment.

In step 606, at least one selected region corresponding to a geographical region of a master globe may be determined based on the quadtree addresses. The may include one or many selected regions of possibly different sizes and shapes. Steps 602-606 may be further illustrated by an example embodiment. A user may perform the following steps to select a region. First, a user viewing an area of the Earth proximate to a region of interest can input an region or area of interest to using a user interface. The user may select a resolution as a default level of resolution, for example, by clicking on the "Set Default Level" button shown in selection interface 310 in FIG. 3. A user may enter a query for cities in Egypt with populations greater than 250,000 people and then select a resolution level. The user may then receive a map highlighting cities in Egypt with populations greater than 250,000 people. In some cases, a user may then navigate to a city of interest and zoom into the highest resolution, at which the user would want to view the selected city or region. The user may then set this resolution as a high resolution level and the city or region of interest would be determined. A source server and globe name may be specified.

In step 608, geospatial data from the master globe may be organized based on the selected regions. Organization may include retrieving master globe tiles and data for the selected region at a higher resolution. This may provide for rendering the portable globe at a higher resolution for the selected region than for the remainder of the portable globe. According to a further embodiment, organization may include retrieving master globe tiles and data at a higher resolution for imagery, terrain and vector data.

In some cases, selected asset types (layers or channels) may be received and geospatial data from the master globe may be organized based on the selected asset type. Asset types may include, but are not limited to, different types of data included in a globe, such as imagery, terrain, and vectors. Imagery and terrain may be considered raster data because they correspond to data values in a rectangular grid, where the data is a color value for imagery and an altitude for terrain. Vector data refers to shapes, e.g. points, polygons, poly lines, etc. that have metadata associated with them. For example, a point could refer to the center of a city and have the city name and population associated with it, or a polygon line could describe a road and have the road name associated with it. All of these asset types may be translated into queries that are searchable in the database.

Organization may include setting a first resolution for the selected region and a second resolution for geospatial data to be retrieved from the rest of the master globe, according to an embodiment. A higher or maximum resolution may be set for the selected query region while a default or lesser resolution may be set for the remainder of the master globe. These resolution levels may be predetermined and/or selected by a user or administrator during the region selection process. According to a further embodiment, organization may include retrieving searchable data from the master globe for the selected query region. It is also possible to include searchable data from the rest of the master globe; however, this searchable data may be a lesser amount to correspond with a lesser resolution of the remainder of the globe.

In step 610, a portable globe is created based on the organized geospatial data. The portable globe may be smaller (in data size) than the master globe and comprise data files that include greater geospatial data for the at least one selected query region than for the remainder of the portable globe. This is due to higher resolutions and greater data retrieved and organized for the query region and less data retrieved for non-selected regions. In some cases, globe creation or fusion (or cutting) may be performed for different asset types or managed separately with potentially different regions of interest. According to embodiments, steps 602-610 may use selection module 212, fusion module 214, master globe repository 216, or any combination of these modules.

The portable globe is transmitted to a local device, in step 608. The local device may be configured to render the portable globe in a GIS, such as Goode Earth. The selected region may be capable of being rendered at a higher resolution than the remainder of the portable globe. Also, more geospatial data and search data may be associated with the selected region. Transmitter 218 may be used for this step.

According to an embodiment, a user may choose to build a globe and then follow a provided URL link to download the created portable globe.

The portable globe may be rendered in a 3D GIS. In 3D, quadtrees are used. In some cases, the portable globe may be rendered in a 2D GIS. For 2D cases, a renderer may request information about a layer. If nothing is there and there is nothing in a layer below that, a server may create or fill in any necessary layers. System 200 may also be used for cutting, organizing, fusing, updating and rendering 2D portable globes.

Updating a Portable Globe

There may be situations where it will make sense for delta updates to be used for very quick updates of a globe. According to an embodiment, globe identification and versioning may be performed using content management tools. Some updates may only modify indexes or append packets. This means that deleted or modified packets would have their old data remain in the packet bundles; these out-of-date packets would no longer have an index entry that points to them. In these cases, if updates were occurring regularly, occasionally obtaining a full copy of a portable globe may be beneficial to recover some space.

According to another embodiment, an existing portable globe on a local device may be updated. A delta description may include, a list of packets to be deleted and another globe, the delta globe. In some embodiments, a delta description may be built by performing a two-globe comparison. An updater application may then read from both the delta globe and the existing globe and write to a new globe. If a packet is to be deleted, it may be ignored. If a packet is in the delta globe, it may be written to the new globe. If a packet with the same quadtree address and type is in the existing globe, it may be ignored. Finally, all other nodes from the existing globe may be written to the new globe. A merger routine may use a standard packet bundle writer and two slightly modified packet bundle readers that allow sequential traversal of the associated indexes.

According to a further embodiment, an updater application may create a new globe and leave the other two globes untouched. In a more disk-space conscious version, the application could remove packet bundle files from the existing globe once they were fully traversed. This could greatly reduce the disk space requirement. In this example, the size requirement may be reduced from 2×globe_size to globe_size+packetbundle_file_size. In another embodiment, region of interest may be maintained separately and new globes or updates may be generated automatically when a master globe is updated. Updating a portable globe may also include, according to an embodiment, rewriting a geospatial data index and appending or merging geospatial data to the portable globe data files. According to a further embodiment, the example methods of updating described above may be assisted by an updater, which works within exemplary system 200.

Portable globes based on selected regions of interest can provide great benefits to users who need access to globe data relevant to their current location without reliable access to a large, central master globe. The portable globe is a lightweight solution that supports easy grab-and-go capabilities.

Figure 7:
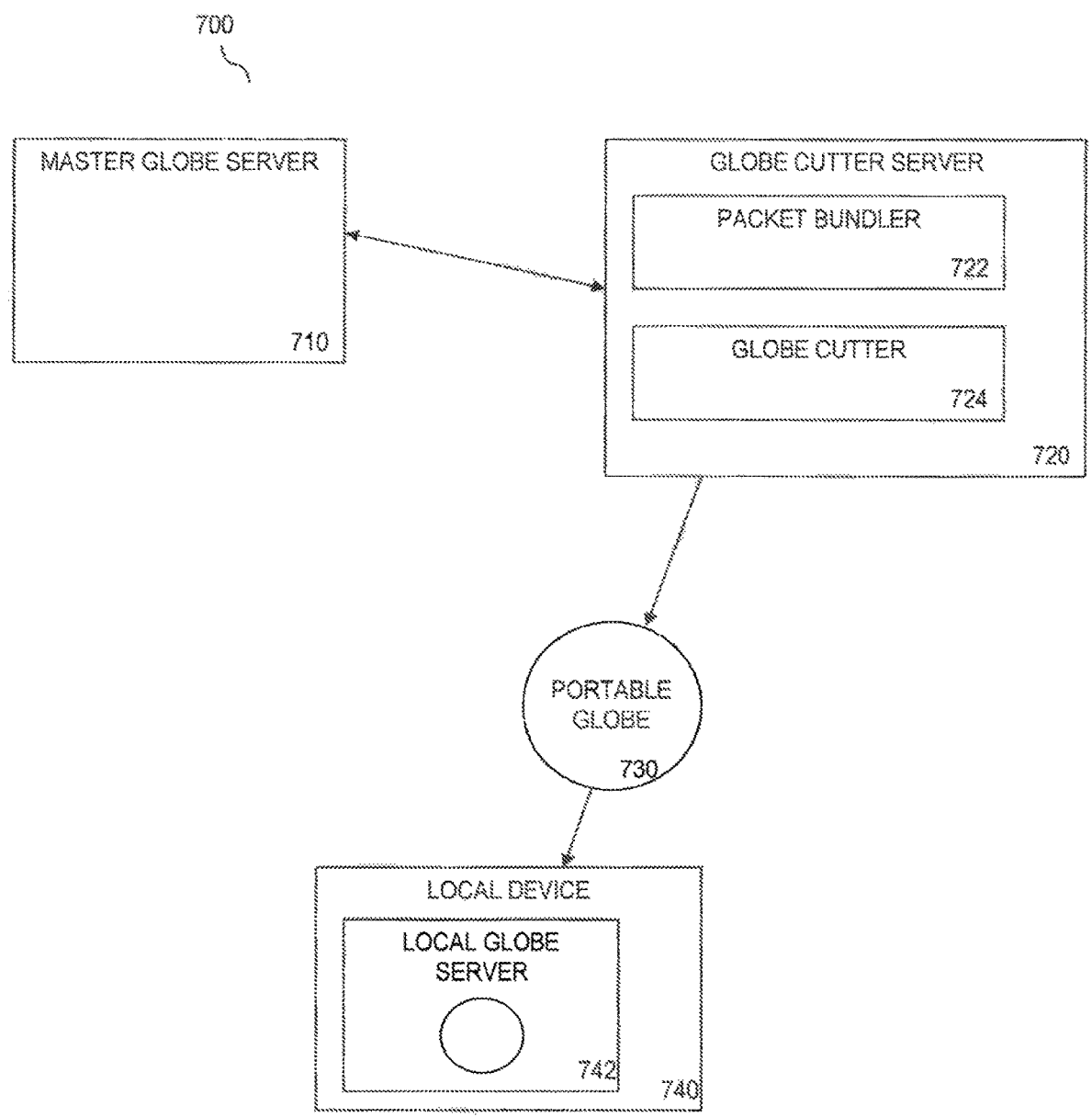
FIG. 7 is a diagram of a system for updating a portable globe for a GIS, according to an embodiment.

FIG. 7 shows an exemplary system 700 for updating a portable globe, according to an embodiment. Local globe server 742 may be provided on local device 740. A portable globe for a geographical information system (GIS), such as portable globe 730, may be created from master globe server 710 by globe cutter server 720 and transmitted over a network according to an embodiment. System 700 shows master globe server 710 in communication with the globe cutter server 720 that can transmit a portable globe 730 to local device 740. Globe cutter server 710 may include packet bundler 722 and globe cutter 724.

Master globe server 710 and globe cutter server 720 may be one or more processor-based computing devices. In other cases, master globe server 710 and globe cutter server 720 may be software executed on one or more processor-based computing devices. According to a further embodiment, globe cutter server 720 may include one or more components, such as packet bundler 722 and globe cutter 724. Local device 740 may also be a computing device. In a some cases, globe cutter server 720 may perform the functions of master globe server 710, or vice versa.

Master globe server 710 may be configured to execute or provide computer software or data, according to an embodiment. Such software or data may relate to graphics applications that render or serve high resolution images, such as in a geographical information system (GIS). These software applications may be displayed in a user interface on master globe server 710 or served to and displayed on a user interface on a client computer, such as local device 740. The user interface may be served through a web-based application that is executed on local device 740. Web-based applications may include web browsers. Web-based applications may also include thin client applications that retrieve content from and provide content to master globe server 710.

According to an embodiment, a user or application may submit a query in reference to one or more geographical regions of the Earth. These regions may be selected from a master globe. Region selection may be performed using a GIS application or a related application, such as local globe server 742, rendered and displayed on local device 740. According to some embodiments, packet bundler 722 or globe cutter 724 may be configured to provide a user interface to enable a user or process to select a region from the master globe 710. Selected regions may be provided to the globe cutter server 720 as packets or packet requests, which are organized by the packet bundler 722. In an exemplary embodiment, packet bundler 722 selects the relevant packets, layers and resolutions for transmitting to master globe server 710. Master globe server 710 may transmit packets of data to packet bundler 122 in response to packet requests.

The user interface may provide a number of tools that allow a user to spin around and navigate a virtual display of the Earth. For example, the user interface may be a Google Earth interface. In some cases, certain regions may be searched using search data or tables associated with a master globe. Packet bundler 722 may receive a request based on a change in the selected region of interest. Packet bundler 722 may also request updates from master globe server 710 based on information indicating that master globe server 710 has been updated.

Figure 8:
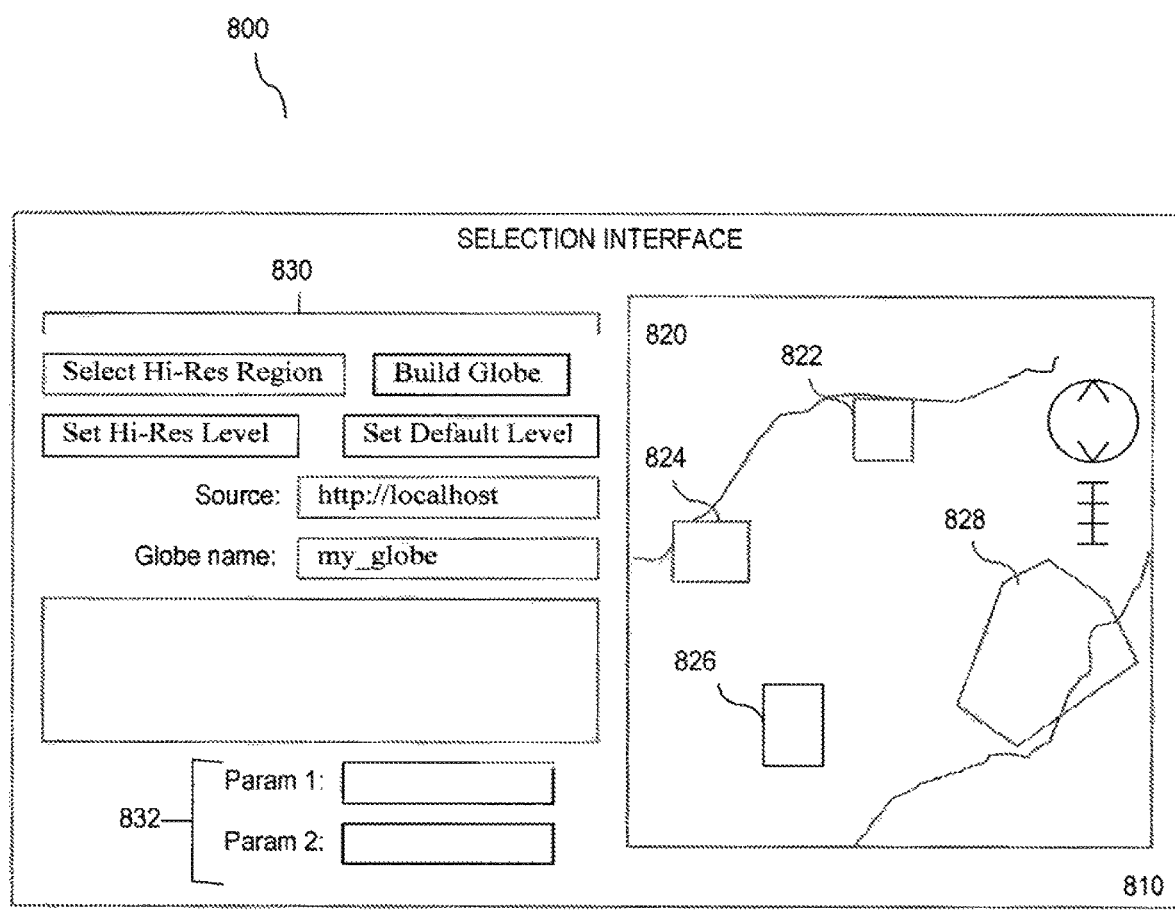
FIG. 8 is an example display view for providing a portable globe for a GIS, according to an embodiment.

FIG. 8 illustrates an example display view 800 of a user interface, such as selection interface 810, according to an embodiment. In some cases, selection interface 810 may be provided by selection module 830. In most cases, selection interface 810 may be displayed through a web-based application window, such as a web browser window. In this case, selection interface 810 shows an image 820 having cities 822-828 that may be rendered as a result of parameters input into parameter fields 832, such as Param 1 and Param 2, of selection interface portion 830. Parameters may be used to query a database. The database may be a memory storing tables or relational data, such as population, nationality, language, demographic information, political information, military information, legal jurisdiction, etc., corresponding to geographical coordinates. These geographical coordinates may be converted to quadtree addresses, which are used to render potential selections in a GIS display of a user interface.

In some cases, further user interaction may refine selected regions. For example, a city representing a region of the Earth may be selected by clicking one of the highlighted cities 822-828 in view 820. In some cases, selection interface 810 can show different color lines or additional graphics to guide a user through the selection process. In other cases, selection interface 810 may provide additional or different selection radio button and input boxes in portion 830 for developing a search query. In another embodiment, the selection interface 810 may be a set of preferences that the may be used to automatically select regions based on parameters or geographical coordinates.

According to a further embodiment, a resolution at which a selected region is to be considered may be predetermined or explicitly set using selection interface portion 830. A default resolution level is a level at which all imagery, terrain, and vector data are included in the portable globe, whether or not they are in the selected region. A selected level is a level at which quadtree nodes are used to define the query region and its interior. A selected level will likely not be a higher resolution than the maximum level.

According to some embodiments, all portions of the Earth overlapping the selected region at a specified resolution are preserved. In most cases, this may be at a maximum resolution, where all imagery, terrain, and vector data that is in the selected region is included in the portable globe. For the rest of the master globe, a background or default resolution may be set. In most cases, this may be a lower resolution, or even a minimum resolution. Once one or more selections are made, selection information is received by packet bundler 722, according to an embodiment. In some cases, location information and resolution information are received. In other cases, only location information is received and resolution information is determined or inferred by selection module 830 or image display 820.

Packet bundler 722 may receive a request for updated geospatial data based on at least one selected region from a local device capable of displaying a spinning-earth GIS. Packet bundler 722 may generate packet requests for master globe server 710, according to an embodiment. Each packet request may include a request for a packet, having geospatial data for a specified quadtree. A series of packet requests may be generated individually. Packet requests may also be generated in a bundled format. Packet bundler 722 may generate packet requests for each layer of the at least one selected region. For example, all terrain layer packet requests may be bundled together. In another packet request bundle, all image layer packet requests may be bundled together. Because packets are generated and bundled per layer, layers having no change in data or that are not required may be omitted from packet requests for master globe server 710. Updated geospatial data may be received from master globe server 710 using the generated request packet bundles.

In an exemplary embodiment, packet bundler 722 may receive packets of data from master globe server 710 representing regions of the Earth. In many cases, packet bundles may be used. Packet bundles may provide a means of storing a large number of indexed packets in a limited number of files that have a maximum size (e.g. 2 GB). The packets may be stored in their "network-ready" state, so they can be extracted from the bundle and passed directly to globe cutter 724 which selects on a portion of the packet bundles corresponding to the selected query region and resolution. Packet bundler 722 may forward these packet bundles to globe cutter 724, which determines if there are changes in the data. In an exemplary embodiment, only packets that contains change or updates are passed along as a delta update, such as through portable globe 730. Portable globe 730 may include a directory containing one or more packet bundle directories. Data files and the index file of a packet bundle are stored at the same level in a single directory. The index file may be ordered by the quadtree path address, and a binary search can be done on it to find the data file id and the offset into the file for any packet. Packet type may be stored in the index, so it is possible to put an entire globe into a single packet bundle. According to a further embodiment, packet bundles may be received or cut on a per layer basis.

According to an embodiment, globe cutter 724 may be configured to create a new portable globe based on the updated geospatial data in the returned packet bundles. The updated geospatial data may be compared to an old portable globe or information related to the request from local device 740. Globe cutter 724 may compare the updated geospatial data with the old portable globe by performing a checksum or a hash sum, such as a cyclic redundancy check (CRC). Globe cutter 724 may also use any other operations for detecting a difference in two data collections with a high probability. Redundancies may be excluded from the new portable globe based on the comparing. As a result, only the differences remain between the updated geospatial data and the old portable globe remain. Comparisons may also be made on a per layer basis.

Globe cutter 724 may create a new portable globe based on the updated geospatial data and provide the new portable globe to the local device with a reference to the old portable globe. Local device 740 can display an updated portable globe having data files that include greater geospatial data for the at least one selected region than for the remainder of the portable globe so that the selected regions, now updated, can be rendered at a higher resolution than the remainder of the portable globe in the spinning-earth GIS on the local device. Globe cutter 724 may create new quadtree packets tier the new portable globe based on the updated geospatial data.

According to an embodiment, globe cutter 724 may involve a simple cgi-bin python interface for cutting the globe. JavaScript code in a cutter page may send out a sequence of commands via standard AJAX techniques to build the globe. Example commands sent may include:

Set up directories in /tmp:
http://my_server/cgi-bin/globe_cutter.py?cmd=ADD_GLOBE_DIRECTORY&globe_name=my_globe
Convert polygon to qt node list:
http://my_server/cgi-

```
bin/globe_cutter.py?cmd=POLYGON_TO_QTNODES&globe_name=my_globe&polygon=
<kml>polygondef.</kml>&polygon=_level=18
    Rewrite dbroot:
    http://my_server/cgi-
bin/globe_cutter.py?cmd=REWRITE_DB_ROOT&globe_name=my_globe&source=http://lo
calhost
    Grab referenced kml:
    http://my_server/cgi-
bin/globe_cutter.py?cmd=GRAB_KML&globe_name=my_globe
    Build globe packet bundles:
    http://my_server/cgi-
bin/globe_cutter.py?cmd=BUILD_GLOBE&globe_name=my_globe&source=http://localhost
&default_level=4&max_
    Extract data for search:
    http://my_server/cgi-
bin/globe_cutter.py?cmd=EXTRACT_SEARCH_DB&globe_name=my_globe&polygon=<k
ml>polygondef.</kml>
    Add files for supporting plugin:
    http://my_server/cgi-
bin/globe_cutter.py?cmd=ADD_PLUGIN_FILES&globe_name=my_globe
    Package globe into a single file:
    http://my_server/cgi-
bin/globe_cutter.py?cmd=PACKAGE_GLOBE&globe_name=my_globe
    Get size info about the globe file:
    http://my_server/cgi-
bin/globe_cutter.py?cmd=GLOBE_INFO&globe_name=my_globe
```

Globe cutter 724 may create an information file as it builds the globe. This file contains all of the major commands that were executed to generate the globe and the file is itself included in the globe. To access the file when the globe is being served, use http://localhost:8888/earth/info.txt.

Portable globe 730 of exemplary system 700 may be transmitted to a local device, such as local device 740 configured to render the portable globe 730 in the GIS, according to an embodiment. For example, local globe server 742 may be used to render a portable globe 730 to other local devices. Local globe server 742 may be a localhost server, such as a Google Earth server on local device 740. Local device 740 may also render portable globe 730 using a client, such as a Google Earth client or a Google Earth viewer. The selected region of the portable globe is capable of being rendered at a higher resolution than the remainder of the portable globe. According to some embodiments, servers may support both localhost-only and shared serving so that the globe can be viewed by only the local machine or shared with a small number of users on a local network.

Figure 9:
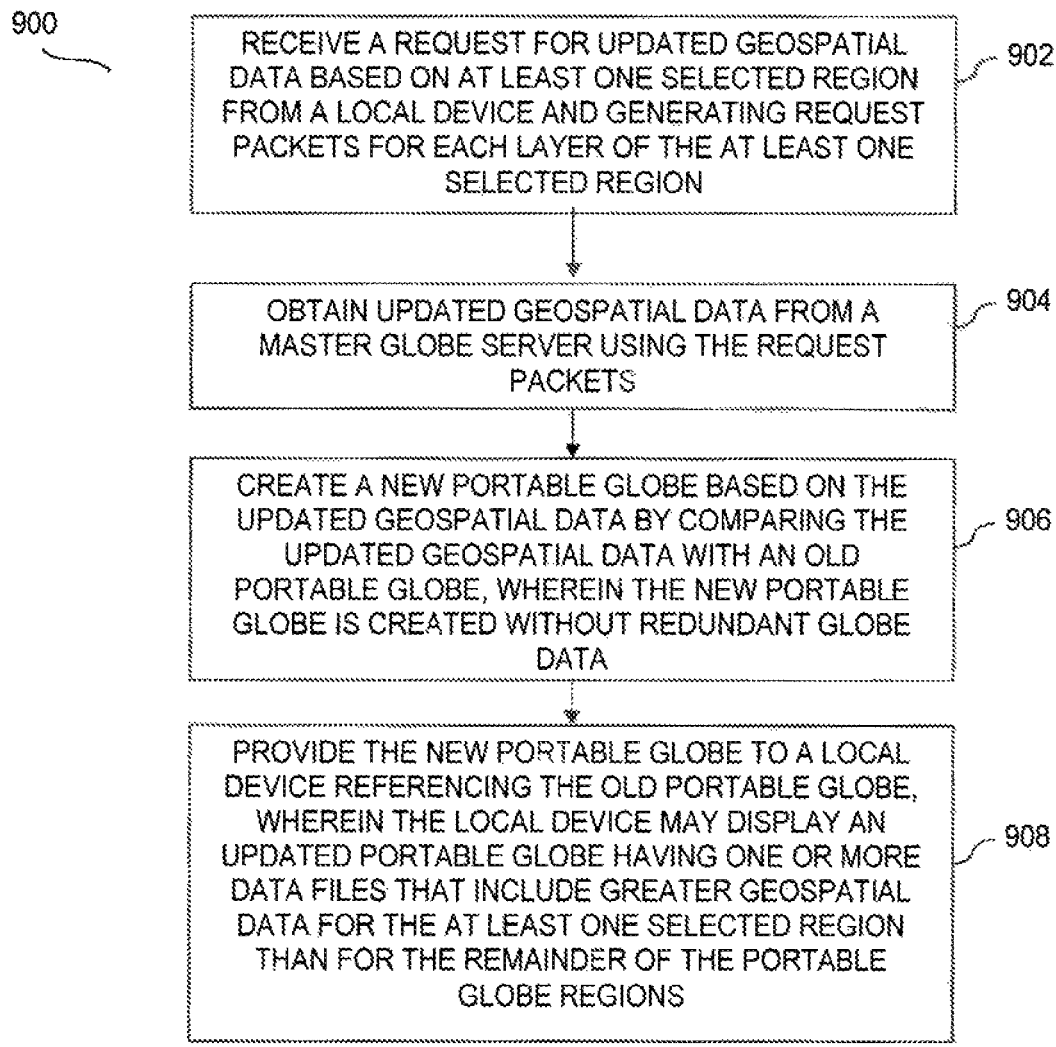
FIG. 9 is a flowchart illustrating a method for updating a portable globe for a GIS, according to an embodiment.

FIG. 9 is a flowchart illustrating an exemplary method 900 for updating a portable globe for a geographical information system (GIS), according to an embodiment. In step 902, a request for updated geospatial data based on at least one selected region is received from a local device 740. Local device 740 may generate packet requests or a request packet bundle for each layer of the selected, region. The request packet bundle is transmitted to the globe cutter server 720. The globe cutter server 720 determines if the request packet is available and updated. If the requested packet bundle is either unavailable or not updated, the globe cutter server 720 sends the request to master globe server 710. In some embodiments, the request may be sent directly to master globe server 710. Data difference checks may be performed by packet bundler 722 or by master globe server 730.

In step 904, the globe cutter server 720 obtains updated geospatial data from a master globe server using the generated request packet bundles. The packet bundler 722 determines which packets and at what resolution is required for the update request. In step 906, the new updated packet bundles are used to create a new portable globe 730 based on the updated geospatial data by comparing the updated geospatial data with the old portable globe. Redundant globe data may be excluded from the new portable globe based on the comparing. For example, globe cutter 724 may remove packet bundles that contain no changes during creation of the new portable globe.

Finally, in step 908, globe cutter 724 provides the new portable globe to the local device with reference to the old portable globe. The local device may display an updated portable globe having data files that include greater geospatial data for the at least one selected region than for the remainder of the portable globe so that the updated globe can be rendered at a higher resolution than the remainder of the portable globe in the spinning-earth GIS on local device 740 using local globe server 742.

Bundling packet requests by layer, or channel, may improve efficiency from 2× to 10×, getting bundles of some specified number of packets for each request. According to an embodiment, to create a delta globe, globe cutter 724 may always have the old portable globe that the delta, or new portable globe, is intended to update. It may only look for updates in the vicinity of the quadtree nodes that envelop the selected regions' quadtree nodes. This can be made more general by storing the quadtree node file as well as the selected regions file. To improve delta efficiency, packet bundler 722 will pre-calculate a cyclic redundancy checksum (CRC) for the packets in each bundle request nom the old portable globe, which will be appended to the packet request. The master globe server of the new master globe that is being cut will then calculate the CRC as it gathers the packets for the response. If the CRCs match, the server will send a NO_CHANGE flag rather than the packets. Otherwise, the packets will be sent and the delta cutter will diff each packet with those from the old portable globe and save those that have been altered or did not previously exist into the new portable globe file (delta or gld). Since deltas will often represent changes in only a subset of the available layers (channels), this approach should greatly reduce the data transfer between globe cutter server 720 and master globe server 710. The new portable globe file format will be identical to the old portable globe file format, but it will contain a dbroot and quadtree that represents both the packets it contains and those contained within the old portable globe (base glb).

The combination of storing both the new quadtree and the new packets in the new portable globe guarantees that unchanged, deleted, altered and new packets ma be represented in the globe as it is served. The new and altered packets will be in the new portable globe file. The unchanged packets will be in the old portable globe file. Deleted packets might still be in the old portable globe file, but they should not be requested because they will not be represented in the quadtree nodes.

Figure 10:
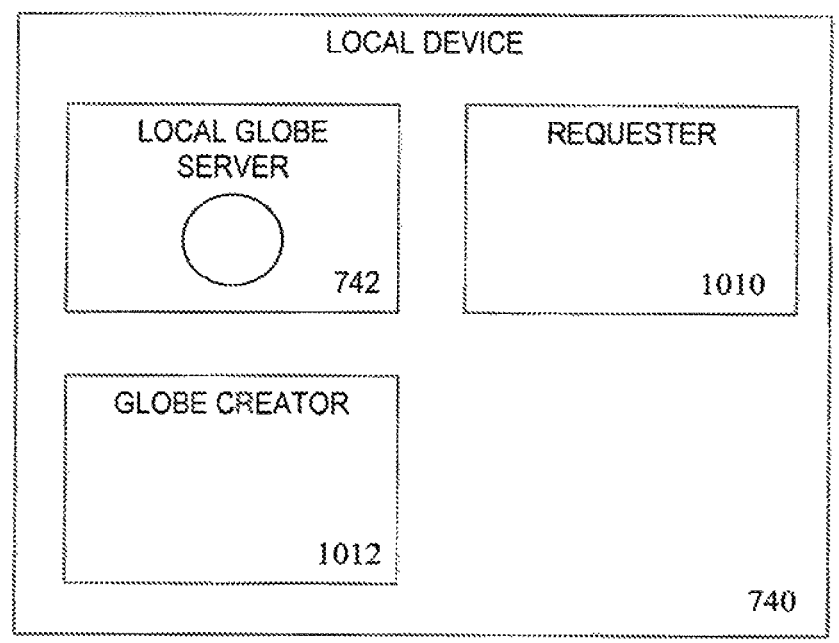
FIG. 10 is a diagram of a system for rendering an updated portable globe for a GIS, according to an embodiment.

FIG. 10 illustrates an exemplary diagram of local device 740 for rendering an updated portable globe on the local device, according to an embodiment. Local device 740 may include local globe server 742 as well as requester 1010 and globe creator 1012. The requester 1010 may respond to query inputs for a selected geospatial region. Globe creator 1012 receives a new portable globe in response to queries submitted by requester 1010. The globe creator renders an updated portable globe with the new portable globe and any references to existing, or old, portable globes.

Updated portable globes may be created in at least two ways: 1) appending the globe file to an existing globe file or 2) merging the portable globes. In an embodiment, globe creator 1012 may append the new portable globe to the old portable globe and update the index of the old portable globe. The updated globe may be rendered for updated portions of the old portable globe. These new updated portable globes may be treated the same way as if separate files.

In another embodiment, globe creator 1012 may merge the new portable globe with the old portable globe. Two or more globes may be chained together, where lower ranked globes are accessed if no data is found in the higher globe. The highest ranked globe would be the master globe, and it would supply the dbroot and the quadtree packets for the updated globe. To get a sense of scale, the portable globe may be 4.7 GB but the quadtree is only 2.1 MB, so rebuilding and copying the quadtree each time is not a huge encumbrance. A delta may be performed against an original globe or against a last globe. The former would allow discarding of earlier delta globes, which is especially useful if the changes tend to all be in the same area. The latter might make subsequent deltas smaller, especially if involving updating different regions than earlier deltas.

A new portable globe may be fused into an old portable, which will then support the same speed of serving as any other portable globe file. This can be done in a single pass with a stream for both the new and old portable files. This may require enough storage to temporarily store an updated globe that is about as big as the original old portable globe and the new portable globe combined. It might be slightly smaller because deleted packets, redundant files, and the original quadtree would all be eliminated. Once the fusion is complete, the old and new portable globes may be deleted.

In another example, globe creator 1012 may replace the old portable globe dbroot file with an updated dbroot file, update the index of the old portable globe and render the updated portable globe using the updated dbroot file. According to a further embodiment, the dbroot file may be rewritten. For instance, paths to icons may extracted from the dbRoot. These paths are relative so they are not rewritten, but the icons are gathered from the source server. The paths for Keyhole Markup Language (KML) and search are rewritten with specified server addresses and ports. The command line tools allow these addresses and ports to be specified independently, in case separate servers other than the portable server will be used to fulfill these functions. The original kml addresses are saved to a file and can be used as seed addresses for gathering all of the kml and referenced files into the portable globe.

The addresses can be controlled via GET variables such as the following:

FORCE_PORTABLE_SERVER—default server address for rewrites (default is "localhost").

FORCE_PORTABLE_PORT—default server, ort for rewrites (default is "9335").

FORCE_PORTABLE_PREFIX—default server prefix for rewrites ("http" or "https").

FORCE_SEARCH_SERVER—search server address (default is the portable server address).

FORCE_SEARCH_PORT—search server port (default is the portable server port).

FORCE_PORTABLE_SERVER—kml server address (default is the portable server address).

FORCE_KML_PORT—kml server port (delimit is the portable server port).

Figure 11:
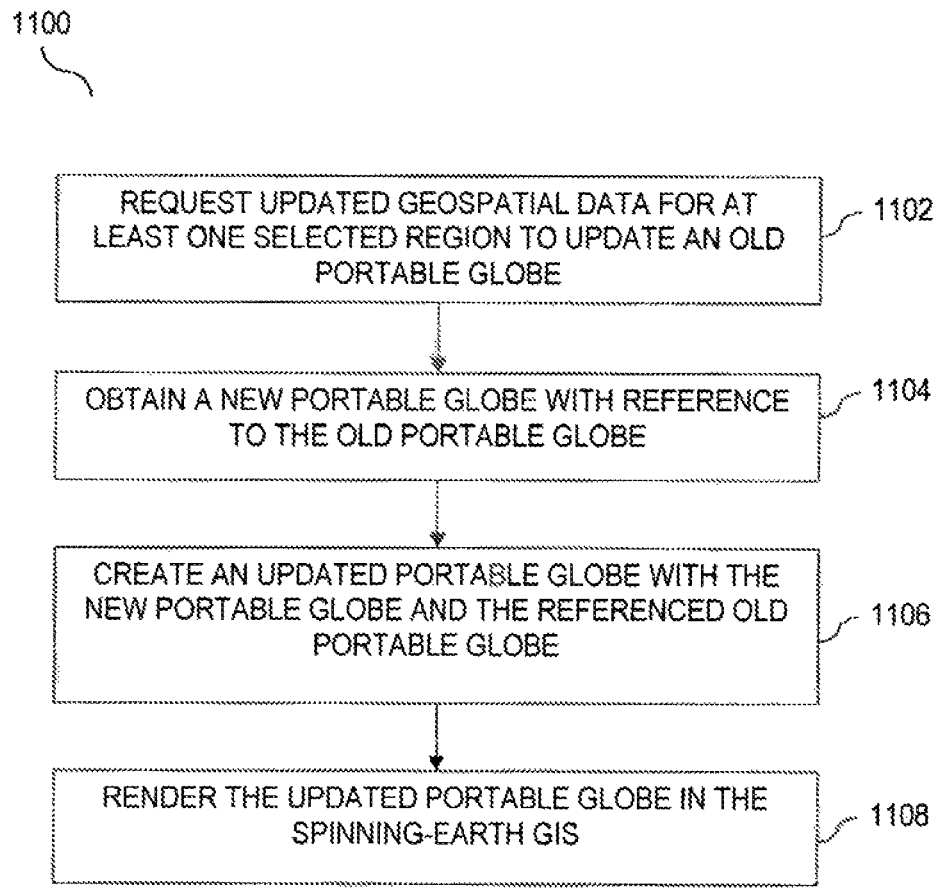
FIG. 11 is a flowchart illustrating a method for rendering an updated portable globe for a GIS, according to an embodiment.

FIG. 11 is a flowchart illustrating an exemplary method 1100 for rendering an updated portable globe in a GIS, according to an embodiment. In step 1102, requester 1010 requests, from a globe server or globe cutter, updated geospatial data for at least one selected region to update an old portable globe. In an exemplary embodiment, the at least one selected region is cable of being rendered at a higher resolution than the remainder of the old portable globe. The globe creator 1012 receives updated geospatial from, for example, the master globe server 710 or indirectly from global cutter server 720. In step 1104, globe creator 1012 obtains the new portable globe and references to one or more old portable globes. Next, in step 1106, globe creator 1012 creates an updated portable globe with the new portable globe and referenced old portable globe. Finally at step 1108, the updated portable globe is rendered in a spinning-earth GIS in a display local device 740 using local globe server 742.

Once the new portable globe is generated, it may be served in concert with the corresponding old portable globe in the manner previously described. In short, the new portable globe may act as the master globe from which all packets and files will be first requested. If a packet is missing, the old portable globe will be sought and packets will be requested from it. The old portable globe will be uniquely identified and referenced by the new portable globe, most likely by its name and creation date. If there is more than one new portable globe file, they can be daisy chained in a similar manner, from most recent to least recent until the old portable globe is reached.

According to another embodiment only one packet bundle file may be created. The data packet bundle would be made up of imagery, terrain, and vector packets rather than separating them into distinct packet bundles as described above. One benefit of this approach is that the data packet bundle will normally be much larger than all of the other files so it can be used as the beginning of the globe file to prevent having to copy all of the data again. The quadtree is kept separate because these are written at different times, although it is possible to put in placeholders for them in the index. The quadtree packet bundle file and its index and the miscellaneous files are appended onto the data packets bundle file and its index. A files index for the miscellaneous files, the data packets bundle index, the quadtree packets bundle file and its index is appended next. The files index is made up of file names, offsets into the globe file, and file sizes. The names of the files are controlled by the globe cutter so there are no namespace issues. The final 8 bytes consists of an offset, so that the files index can be found, and a CRC for the entire globe file.

This approach is amenable to a delta publishing approach. The delta globe file would be identical to a globe file except that it would also contain a reference to another globe file or to another delta globe file in the files index. Unifying an old portable globe file and one or more new portable globe files into a single updated globe file would be straightforward. Such a tool would be useful for not allowing the number of new portable globe files associated with a file from getting too big, since these may degrade performance because they rely on a fail-over approach.

A Portable Proxy Server will allow users to access portable globes being served on other machines, according to an embodiment. For their clients, namely Google Earth and the 3D Plugin, both the portable and proxy servers will always appear to be on localhost on some specified port. This allows the hard-coding of KML paths and search tabs in the dbroot. If the user does NOT specify a key, then only the local machine can access the globe through localhost. If the user specifies a key, then he or she can share it with others having a proxy server on his or her machine. They start the proxy servers with the portable server's IP address and the shared key. The globe can be viewed as if it were being served locally on their machine.

The key offers simple but fairly effective security. It is combined with each proxy server's IP address and passed as a digest. This means man-in-the-middle attacks are pretty hard. It is always easy to change the key by restarting the portable server, so it only has to last a short amount of time. Decoding the key after a globe is no longer using it, has no purpose assuming people constantly change their keys. As an example, if a user enters a room of 10 people and wants to share a globe with them but there is only a shared network available, the user may tell everyone a key and start using that key. The other users would start their proxy servers using that key.

Although aspects of the invention can be used for images and data related to geographical locations in a GIS, embodiments of the invention are not limited to geographical locations or buildings. Aspects of the invention can also be used as a means of storing, transferring and securing any file-based data in areas of manufacturing, engineering design, research, medicine, physics, biology, geology, astronomy, architecture, entertainment, sports, or any other field that involves imaging from various perspectives.

Aspects of the present invention, for exemplary systems 100-400, 700-800 or 1000 and/or methods 500-600, 900 or 1100 or any part(s) or function(s) thereof may be implemented using hardware, software, firmware, tangible computer readable or computer usable storage media having instructions stored thereon, or a combination thereof and may be implemented in one or more computer systems or other processing systems.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only accordance with the following claims and their equivalents.

What is claimed is:

1. A method for providing a portable globe for a geographical information system (GIS), comprising:
   receiving at least one selected region corresponding to a geographical region of a master globe;
   organizing geospatial data from the master globe based on the at least one selected region;
   creating the portable globe based on the organized geospatial data, wherein the portable globe is smaller in data size than the master globe and comprises data files that include geospatial data having a higher resolution for the at least one selected region than for the remainder of the portable globe; and
   transmitting the portable globe to a local device configured to render the portable globe in the GIS, wherein the at least one selected region is capable of being rendered at a higher resolution than the remainder of the portable globe.

2. A method for providing geospatial data to a local device from a remote device located remotely from the local device, the method comprising:
   receiving, by one or more processors, one or more queries for one or more geographical coordinates associated with a region;
   obtaining, by the one or more processors, geospatial data from a database in response to the one or more queries, the geospatial data obtained from the database including geospatial data associated with the region and geospatial data associated with a geographic area located outside the region; and
   transmitting, by the one or more processors, the geospatial data including the geospatial data associated with the region and the geospatial data associated with the geographic area located outside the region to the local device;
   wherein the geospatial data including the geospatial data associated with the region and the geospatial data associated with the geographic area located outside the region are capable of being rendered at the local device during a period of reduced network connectivity between the local device and the remote device.

3. The method of claim 2, wherein the geospatial data is obtained from the database such that the geospatial data associated with the region is associated with a different resolution than the geospatial data associated with the geographic area located outside the region.

4. The method of claim 2, wherein the geospatial data is obtained from the database such that the geospatial data associated with the region is associated with a higher resolution than the geospatial data associated with the geographic area located outside the region.

5. The method of claim 2, wherein obtaining geospatial data from the database comprises retrieving data files that include geospatial data having a higher resolution for the region than for the geographic area located outside the region.

6. The method of claim 2, wherein the geospatial data associated with the region is capable of being rendered at a higher resolution at the local device than the geospatial data associated with the geographic area outside the region.

7. The method of claim 2, wherein:
the region corresponds to a geographical region covering a portion of a master globe; and
the geospatial data associated with the region and the geospatial data associated with the geographic area located outside the region comprise a portable globe; and
the portable globe includes master globe tiles and data for the region that include greater geospatial data for the region than for the remainder of the portable globe.

8. The method of claim 7, further comprising:
organizing the geospatial data by setting a first resolution for the region and a second resolution for other portions of the master globe.

9. A computing system comprising one or more processors and one or more memory devices, the one or more processors configured to execute computer-readable instructions stored in the one or more memory devices that cause the one or more memory devices to perform operations, the operations comprising:
receiving one or more queries associated with a database, the one or more queries including one or more geographical coordinates associated with a region;
obtaining geospatial data from a database in response to the one or more queries, the geospatial data obtained from the database including geospatial data associated with the region and geospatial data associated with a geographic area located outside the region; and
transmitting the geospatial data including the geospatial data associated with the region and the geospatial data associated with the geographic area located outside the region to the local device;
wherein the geospatial data including the geospatial data associated with the region and the geospatial data associated with the geographic area located outside the region are capable of being rendered at the local device during a period of reduced network connectivity between the local device and the remote device.

10. The computing system of claim 9, wherein the geospatial data is obtained from the database such that the geospatial data associated with the region is associated with a different resolution than the geospatial data associated with the geographic area located outside the region.

11. The computing system of claim 9, wherein the geospatial data is obtained from the database such that the geospatial data associated with the region is associated with a higher resolution than the geospatial data associated with the geographic area located outside the region.

12. The computing system of claim 9, wherein obtaining geospatial data from the database comprises retrieving data files that include geospatial data having a higher resolution for the region than for the geographic area located outside the region.

13. The computing system of claim 9, wherein:
the geospatial data associated with the region is capable of being rendered at a higher resolution at the local device than the geospatial data associated with the geographic area outside the region.

14. The computing system of claim 9, wherein:
the region corresponds to a geographical region covering a portion of a master globe; and
the geospatial data associated with the region and the geospatial data associated with the geographic area located outside the region comprise a portable globe; and
the portable globe includes master globe tiles and data for the region that include greater geospatial data for the region than for the remainder of the portable globe.

15. A method for providing geospatial data on a local device, the geospatial data obtained from a remote device located remotely from the local device, the method comprising:
querying, by one or more processors, a database for one or more geographical coordinates associated with a region;
obtaining, by the one or more processors, geospatial data from the remote device in response to the query, the geospatial data obtained from the remote device including geospatial data associated with the region and geospatial data associated with a geographic area located outside the region that; and
rendering, by the one or more processors, the geospatial data at the local device during a period of reduced network connectivity between the local device and the remote device;
wherein the geospatial data including the geospatial data associated with the region and the geospatial data associated with the geographic area located outside the region are capable of being rendered at the local device during the period of reduced network connectivity between the local device and the remote device.

16. The method of claim 15, wherein the geospatial data is obtained from the remote device such that the geospatial data associated with the region is associated with a different resolution than the geospatial data associated with the geographic area located outside the region.

17. The method of claim 15, wherein the geospatial data is obtained from the remote device such that the geospatial data associated with the region is associated with a higher resolution than the geospatial data associated with the geographic area located outside the region.

18. The method of claim 15, wherein accessing geospatial data from the remote device comprises retrieving data files that include geospatial data having a higher resolution for the region than for the geographic area located outside the region.

19. The method of claim 15, wherein the geospatial data associated with the region is capable of being rendered at a higher resolution at the local device than the geospatial data associated with the geographic area outside the region.

20. The method of claim 15, wherein:
the region corresponds to a geographical region covering a portion of a master globe;
the geospatial data associated with the region and the geospatial data associated with the geographic area located outside the region comprise a portable globe;

the portable globe includes master globe tiles and data for the region that include greater geospatial data for the region than for the remainder of the portable globe; and the method further comprises organizing the geospatial data by setting a first resolution for the region and a second resolution for other portions of the master globe.

* * * * *